Jan. 27, 1959　　　　　　A. SERAFIN　　　　　2,870,636
ORAL THERMOMETER STRUCTURE
Filed Feb. 8, 1955

INVENTOR.
ARDIS SERAFIN
BY
Barnes Kisselle Laughlin & Raisch
ATTORNEYS.

United States Patent Office 2,870,636
Patented Jan. 27, 1959

2,870,636

ORAL THERMOMETER STRUCTURE

Ardis Serafin, Detroit, Mich.

Application February 8, 1955, Serial No. 486,760

5 Claims. (Cl. 73—371)

This invention relates to a clinical thermometer for making a plurality of independent temperature readings at separate oral locations.

I have discovered that at times there is a temperature differential between right and left side regions of the human mouth and that at other times the temperatures of these regions are the same. Through observation, I have concluded that a comparison of the temperatures at different oral locations provides an indication of current inter-relations between emotion, intellection and bodily energies generally. For example, a higher temperature on one side of the mouth, such as the right side, indicates a present harmonious interaction of mental and bodily processes and a resulting efficient utilization of creative energy while a higher temperature on the other side of the mouth indicates a present conflict between such inner processes and a resulting waste of creative energy. I believe that a charting of such temperature readings may be valuable in diagnosing physical and mental disturbances.

The oral temperature readings can be made with ordinary clinical thermometers inserted under right and left portions of the tongue. However, for more accurate results it is desirable to take simultaneous readings and heretofore it has been necessary to use two separate thermometers. It is inconvenient and difficult to hold two thermometers in the mouth and there is no positive means for securing thermometers in properly spaced relation to insure the desired readings. The danger of breakage is increased in using two thermometers and the inconvenience of shaking them down following use is doubled.

An object of this invention is to provide a simple, inexpensive thermometer structure for obtaining simultaneous independent temperature readings at separate predetermined oral locations. The invention generally contemplates securing two independent thermometers on a common support with the thermometers spaced for contacting separate regions of the mouth. One form of the invention is illustrated in the accompanying drawings.

Figure 1:
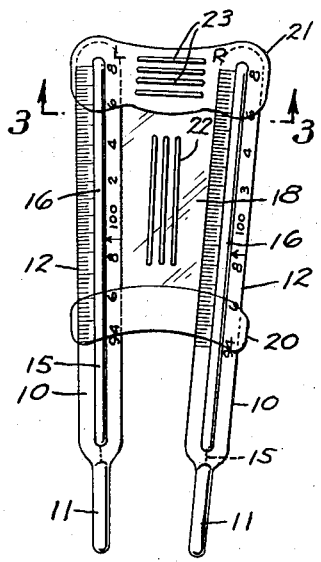
Fig. 1 is a front elevational view of a thermometer structure according to this invention.
Figure 2:
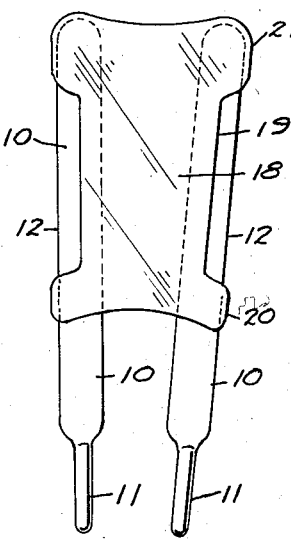
Fig. 2 is a rear elevational view of the thermometer structure of Fig. 1.

The thermometer structure shown in the drawings includes two preferably identical thermometers 10 which may be of the mercury column type, each having a mercury filled bulb 11 adapted to be inserted under the human tongue and having an elongate graduated stem 12. Each thermometer 10 has a relatively small passageway 15 communicating into bulb 11 and extending throughout the length of graduated stem 12. The thermometers are made of a relatively strong transparent material such as glass or a plastic and each thermometer has a lens shaped portion 16 positioned to facilitate reading the height of the mercury column in passageway 15.

Figure 3:
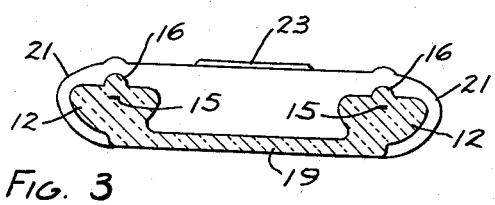
Fig. 3 is an enlarged, partly diagrammatic, sectional view on line 3—3 of Fig. 1.

The thermometers 10 are mounted on a common support 18 which is preferably made of the same material as the thermometers themselves and which includes a back plate 19 connected to the rear portions of stem 12 (Fig. 3), a collar portion 20 encircling the stems adjacent their lower ends and another collar portion 21 encircling the upper ends of stems 12, that is, the portions of the stems remote from bulbs 11. Stems 12, back plate 19 and collars 20 and 21 may be integrally formed for maximum mutual support. Back plate 19 may have reinforcing ribs 22 formed therein and collar 21 preferably has outwardly projecting rib portions 23 providing a finger hold.

Bulbs 11 are spaced apart so that they may be conveniently inserted under opposite sides of the tongue. The bulbs are illustrated as being spaced about ½ inch apart though this may be varied to suit individual requirements. Thermometers 10 are angled slightly to each other, converging toward their bulb portions, the angle between the thermometers lying preferably within the range of from five degrees to twelve degrees. Lower collar 20 is spaced from bulbs 11 a sufficient distance so that the bulbs may be inserted under the tongue without interference from the collar.

In use, bulbs 11 are inserted under opposite side portions of the tongue for taking simultaneous, independent temperature readings. The bulbs are secured positively in properly spaced apart positions while under the tongue by common support 18 and the angle between thermometers 10 facilitates comfortable, correct seating of the bulbs. After the necessary time interval, the thermometer structure is withdrawn from the mouth and both thermometers are read to determine the comparative temperatures on opposite sides of the mouth. After thermometers 10 have been read, they may be prepared for subsequent use by grasping rib portions 23 of collar 21 and shaking the thermometers down simultaneously in a single operation.

Dual temperature readings may thus be taken by the use of this unitary thermometer structure. The readings obtained are simultaneous and accurately record the temperatures at predetermined, spaced apart locations in the mouth. The structure is easily positioned and conveniently held in the mouth and the mutually supporting structure of plate 18, the collars and the thermometer stems minimizes breakage.

Figure 4:
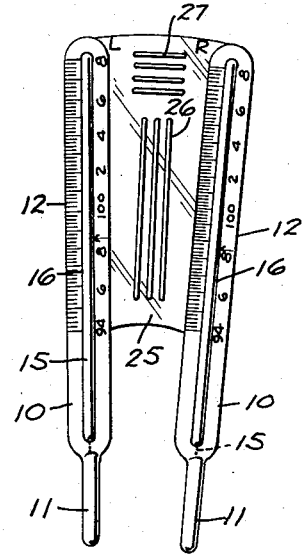
Fig. 4 is a front elevational view of a modified form of the invention.
Figure 5:
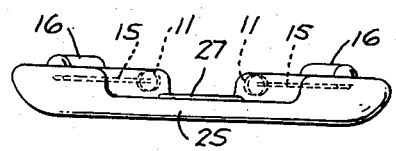
Fig. 5 is an enlarged top plan view of the modified form with parts shown in phantom to illustrate structure.

The modified form of the invention shown in Figs. 4 and 5 is similar to the principal form with like parts identified by like reference characters. In this form of the invention the stem portions 12 of thermometers 10 are interconnected by a web element 25 integrally formed with the side portions of stems 12 as shown. Web 25 has reinforcing ribs 26 and has ribs 27 at its upper end forming a finger hold for shaking the thermometers down. Use of this form of the invention is similar to use of the principal form.

Figure 6:
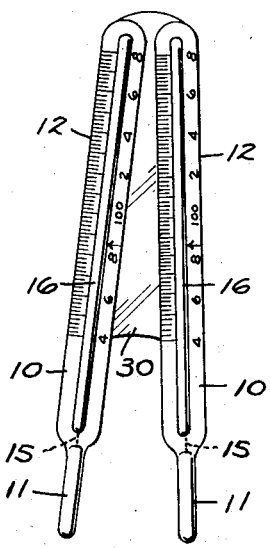
Fig. 6 is a front elevational view of another modified form of the invention.

The modified form of the invention shown in Fig. 6 is similar to the principal form with like parts identified by like reference characters. In this form of the invention the stem portions 12 of the thermometers 10 are interconnected by a web element 30 integrally formed with the side portions of stems 12. The thermometers are angled to each other but converge toward their upper end portions as shown. Use of this form of the invention is similar to use of the principal form.

I claim:
1. A clinical thermometer structure for obtaining simultaneous plural, oral temperature readings, comprising a pair of fluid column type thermometers, each having a bulb for insertion under a human tongue and having an elongate stem graduated to indicate temperature, said stems having longitudinally extending side walls, support means for said thermometers, said support means being integrally joined with said side walls with the junctures between said support means and side walls extending longitudinally along a major extent of said side walls, said thermometers extending in generally the same plane with said bulbs projecting free of said support means, said support means having a width dimension between said stems of less than the general width of the human tongue and said bulbs being spaced apart a distance less than the general width of the human tongue, whereby said bulbs can be inserted beneath spaced apart portions of a human tongue for obtaining simultaneously independent temperature readings.

2. The thermometer structure defined in claim 1 wherein said stems have a generally predetermined cross dimension and said support means has a relatively thin dimension in generally said plane in which said thermometers extend.

3. The thermometer structure defined in claim 1 wherein the width of said support means between said junctures tapers at an angle of from about 5° to about 12°.

4. The thermometer structure defined in claim 1 wherein said support means has integral protuberances which extend transversely between said stems to form finger holds.

5. A clinical thermometer structure for obtaining simultaneous plural, oral temperature readings, comprising a pair of fluid column type thermometers, each having a bulb for insertion under a human tongue and having an elongate stem graduated to indicate temperature, said stems having a predetermined cross dimension and having longitudinally extending side walls, support means for said thermometers, said support means being integrally joined with said side walls with the junctures between said support means and side walls extending longitudinally along a major extent of said side walls, said thermometers extending in generally the same plane, said support means having a thickness dimension in said general plane smaller than said cross dimension of said stems, and having integral reinforcing protuberances extending transversely between said stems and forming finger holds, said support means having a width dimension between said stems of less than the general width of the human tongue, said bulbs being spaced apart a distance less than the general width of the human tongue and projecting free of said support means in a longitudinal direction, whereby said bulbs can be inserted beneath spaced apart portions of a human tongue for obtaining simultaneous independent temperature readings.

References Cited in the file of this patent
UNITED STATES PATENTS

| | | |
|---|---|---|
| 1,081,139 | Parliman | Dec. 9, 1913 |
| 1,589,294 | Fusca | June 15, 1926 |
| 1,648,939 | Evins | Nov. 15, 1927 |
| 1,935,784 | Smith | Nov. 21, 1933 |
| 2,435,588 | Hintsala | Feb. 10, 1948 |
| 2,451,746 | Keller et al. | Oct. 19, 1948 |